United States Patent [19]
Cannon et al.

[11] 4,264,850
[45] Apr. 28, 1981

[54] POSITION ENCODER INTERFACE FOR A SERVO CONTROL SYSTEM

[75] Inventors: Lee E. Cannon; Daniel R. Cheever, both of Bozeman, Mont.

[73] Assignee: Dana Corporation, Toledo, Ohio

[21] Appl. No.: 19,710

[22] Filed: Mar. 12, 1979

[51] Int. Cl.³ .......................................... G05B 19/24
[52] U.S. Cl. .................... 318/574; 318/570; 318/607; 318/608; 318/601; 318/603
[58] Field of Search ............... 318/606, 607, 608, 570, 318/574, 600, 601, 603

[56] References Cited

U.S. PATENT DOCUMENTS

| | | | |
|---|---|---|---|
| 3,349,229 | 10/1967 | Evans | 318/608 |
| 3,532,955 | 10/1970 | Henegar | 318/608 |
| 3,571,686 | 3/1971 | Henegar | 318/608 |
| 3,836,756 | 9/1974 | Yammoto et al. | 318/608 |
| 3,878,983 | 4/1975 | Hamill et al. | 318/569 |

Primary Examiner—J. V. Truhe
Assistant Examiner—Eugene S. Indyk
Attorney, Agent, or Firm—Wilson, Fraser, Barker & Clemens

[57] ABSTRACT

An encoder interface circuit is responsive to command direction signals and pulsed command incremental rotation signals and to actual direction signals and pulsed actual incremental rotation signals to generate an error signal to a motor driver for controlling the movement of a servo motor. A position encoder is mechanically coupled to the servo motor for generating the actual direction and incremental rotation signals. The interface circuit generates a reference pulse train and an error pulse train, both at a relatively high frequency. The error pulse train is phase modulated by adding or subtracting the pulsed actual and command incremental signals according to the state of the corresponding direction signals. The reference and phase modulated error pulse trains are then compared to generate the error signal to the motor driver.

15 Claims, 4 Drawing Figures

POSITION ENCODER INTERFACE FOR A SERVO CONTROL SYSTEM

BACKGROUND OF THE INVENTION

1. Field of the Invention

The present invention relates in general to servo control systems and in particular to a machine tool numerical control system with position encoder feedback.

2. Description of the Prior Art

Numerical control systems for controlling machine tools can be operated in either open-loop or closed-loop configurations. In the open-loop configuration, control signals are generated to a drive means for moving the machine tool to a selected position. However, no check is made by this system to determine if the machine tool has actually reached the selected position. In the closed-loop system, a feedback signal representing the actual position of the machine tool is compared with a control signal representing the selected position to generate an error signal which is utilized to move the machine tool to the selected position.

One type of device which is commonly used to generate the feedback signal is an electromechanical device known as an encoder. The encoder is mechanically coupled to the machine tool and generates a series of pulses which are utilized to determine the actual position of the machine tool. If the actual position of the machine tool is not equal to the selected position of the machine tool, an error voltage is generated to correct the machine tool position.

SUMMARY OF THE INVENTION

The present invention concerns a circuit for interfacing a position encoder to a numerical control system for a machine tool. The control system generates a command direction signal and a command rotation signal representing the desired movement for the servo motor associated with each axis of movement of the machine tool. Typically, the command rotation signal is a pulse train wherein each pulse represents one predetermined increment of rotation of the servo motor. The rate of generation or frequency of the pulse train determines the motor velocity and the rates of acceleration and deceleration. The position encoder is mechanically coupled to the servo motor and generates an actual direction signal and a pulsed actual rotation signal with each pulse representing an increment of rotation of the servo motor.

The interface circuit for each position encoder includes a pulse synchronizer and a phase comparator. The pulse synchronizer generates a reference pulse train and an error pulse train, both pulse trains being at the same relatively high frequency. The error pulse train is phase modulated by adding or subtracting the command pulses and the position encoder pulses in accordance with the associated direction signals. The phase comparator is responsive to the reference and error pulse trains to generate the error signal to a motor drive for controlling the servo motor.

It is an object of the present invention to interface a position encoder as a feedback device in a machine tool numerical control system.

DESCRIPTION OF THE PREFERRED EMBODIMENT

Figure 1:
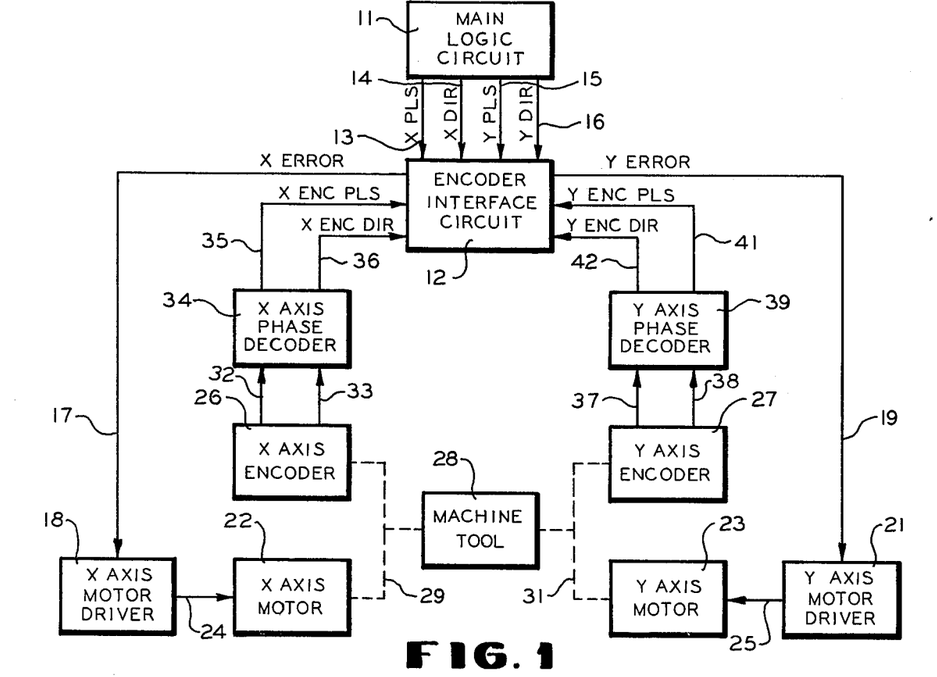
FIG. 1 is a block diagram of a machine tool control system including an encoder interface circuit according to the present invention.

Referring to FIG. 1, there is shown a block diagram of a two axis machine tool control system including an encoder interface circuit according to the present invention. Although the present invention can be implemented with any number of axes, this discussion will be limited to a two axis system to simplify the description. This control system can be utilized to accurately position a machine tool at an operator selected point. The selected point and other command instructions are supplied to a main logic circuit 11 via a data input such as a keyboard (not shown).

The main logic circuit 11 generates a series of motor control signals representing the selected position for the machine tool to an encoder interface 12. An X PLS signal, an X DIR signal, a Y PLS signal and a Y DIR signal are generated on the lines 13, 14, 15 and 16 respectively. The X PLS signal and the Y PLS signal represent the selected incremental amount of rotation of the X and Y axis motors respectively, while the X DIR signal and the Y DIR signal each represent the direction the respective motor is to be rotated.

The encoder interface circuit 12 generates an X ERROR signal on a line 17 to an X axis motor driver 18 and generates a Y ERROR signal on a line 19 to a Y axis motor driver 21. The motor drivers 18 and 21 utilize the respective error signals to generate power to an X axis driving motor 22 and a Y axis driving motor 23 on a pair of lines 24 and 25 respectively. Although the motors 22 and 23 are typically DC, many types of AC or stepping motors can be used.

An X axis encoder 26 and a Y axis encoder 27 are utilized to generate signals representing the actual position of a machine tool 28. A dashed line 29 is representative of the mechanical interconnections between the encoder 26, the motor 22, and the machine tool 28. Another dashed line 31 is representative of the mechanical interconnections between the encoder 27, the motor 23, and the machine tool 28. The X axis encoder generates a pair of quadrature phase signals on lines 32 and 33 to an X axis phase decoder 34. The quadrature phase signals represent the actual position of the X axis encoder shaft and are processed by the decoder 34 to generate an X ENC PLS signal on a line 35 and an X ENC DIR signal on a line 36 to the encoder interface circuit 12. The X ENC PLS signal consists of a series of pulses each of which represents a fixed amount of rotation of the encoder shaft. The X ENC DIR signal indicates the actual direction of revolution of the encoder shaft. Similarly, the Y axis encoder 27 generates a pair of quadrature phase signals on lines 37 and 38 to a Y axis phase decoder 39 which signals represent the position of the Y axis encoder shaft. The decoder 39 processes the quadrature phase signals to generate a Y ENC PLS signal on a line 41 and a Y ENC DIR signal on a line 42 to the encoder interface circuit 12.

A detailed description of the main logic circuit 11 is disclosed in U.S. patent application Ser. No. 731,867 entitled "Stepping Motor Control Circuit", which is incorporated herein by reference. The X PLS and Y PLS signals are typically pulse trains. The main logic circuit 11 can include means for accelerating and decelerating and controlling the velocity of the machine tool 28 by varying the rate of the pulses of the X PLS signal and the Y PLS signal to the encoder interface which controls the respective motor drivers. The main logic circuit 11 can also be utilized to control the path along which the tool is to be moved by selectively disabling either of the motors to direct the movement of the machine tool in either a linear path or a circular path having a selected radius.

The encoder interface circuit 12 is utilized in conjunction with the encoders 26 and 27 and the phase decoders 34 and 39 to accurately position the machine tool at a desired point. Each of the encoders 26 and 27 is an electromechanical device which generates a pair of quadrature phase signals representing the actual position of the respective encoder shafts. As the axis motors move the machine tool, the magnitudes of the quadrature phase signals vary in accordance with the position of the respective encoder shafts. The quadrature phase signals are supplied to the respective phase decoders which process the phase signals to determine the respective ENC PLS signal and the ENC DIR signal.

The X and Y ENC PLS signals and the X and Y ENC DIR signals are feedback signals representing the actual amount of rotation of the encoder shaft. The encoder interface circuit 12 compares the control signals from the main logic circuit 11 with the feedback signals from the decoders 34 and 39 to generate the X and Y ERROR signals on the lines 17 and 19 respectively. As will be discussed, the circuit 12 includes a means for generating a frequency error signal for each axis which is phase modulated with respect to a frequency reference signal. Each frequency error signal is compared with the frequency reference signal to generate the respective error signal to the respective motor driver.

Figure 2:
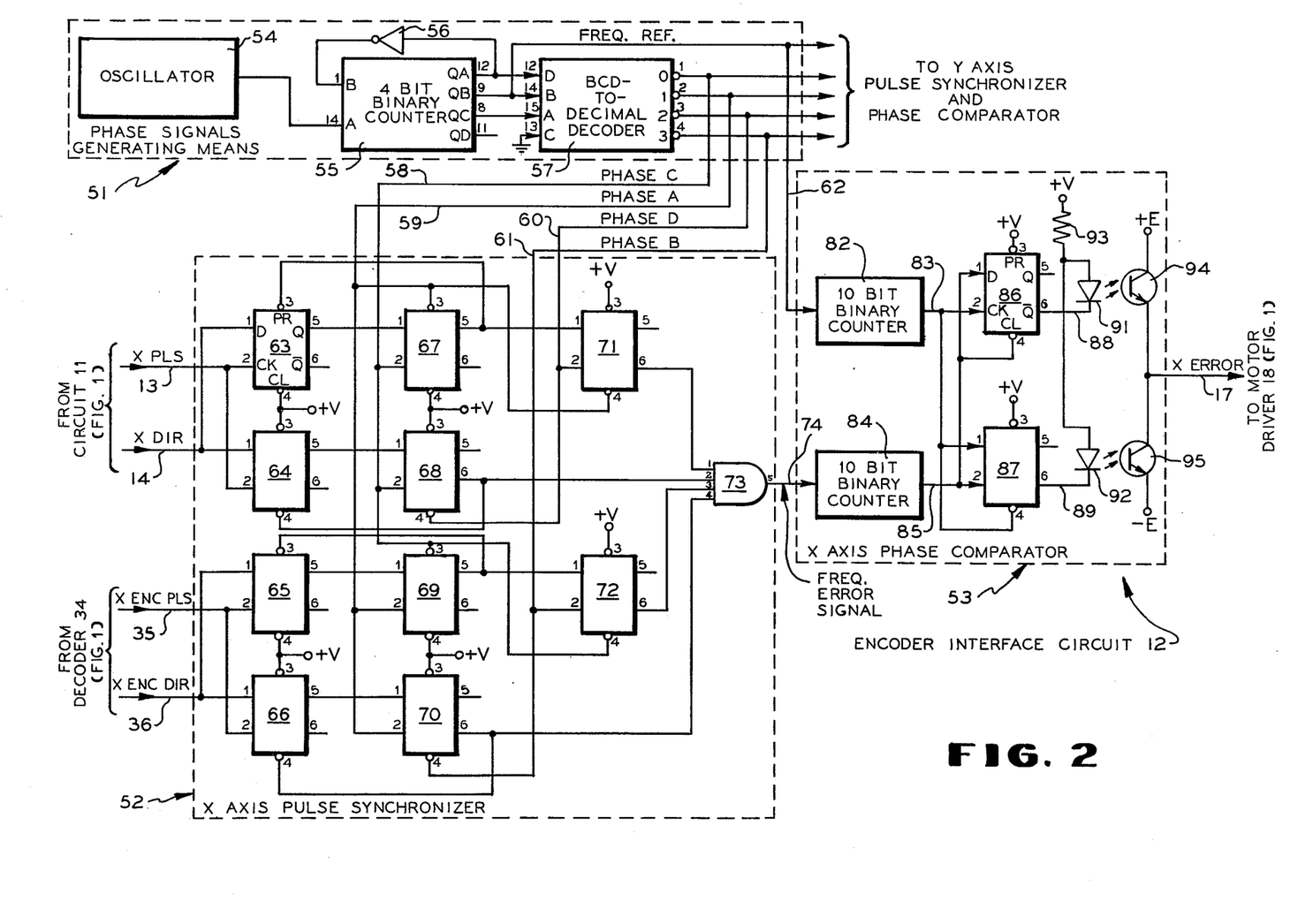
FIG. 2 is a part schematic, part block diagram of a portion of the encoder interface circuit of FIG. 1.

There is shown in FIG. 2 a portion of the encoder interface circuit 12 of FIG. 1. A phase signals generating means 51 generates a group of phase control signals to an X axis pulse synchronizer 52 and generates a frequency reference signal to an X axis phase comparator 53. The phase control signals and the frequency reference signal are also supplied to a Y axis pulse synchronizer (not shown) and a Y axis phase comparator (not shown) which are similar to the synchronizer 52 and the comparator 53.

The phase signals generating means include an oscillator 54 for generating a pulse train at a predetermined frequency to an A clock input 55-14 of a four bit binary counter 55. The counter 55 can be an SN74LS93 counter manufactured by Texas Instruments, Inc. of Dallas, Texas. The counter has a QA output 55-12 connected to a B clock input 55-1 through an inverter 56. The counter also has outputs QB 55-9, QC 55-8 and QD 55-11. The pulse train at the A clock input 55-14 is divided by two at the QA output 55-12, by four at the QB output 55-9 and by eight at the QC output 55-8. The inverter 56 shifts the QB and QC pulse trains such that the leading and trailing edges of the "1" pulses are triggered by the leading edges of the QA "1" pulses. The QD output 55-11 is not utilized and, therefore, is not connected.

Figure 3:
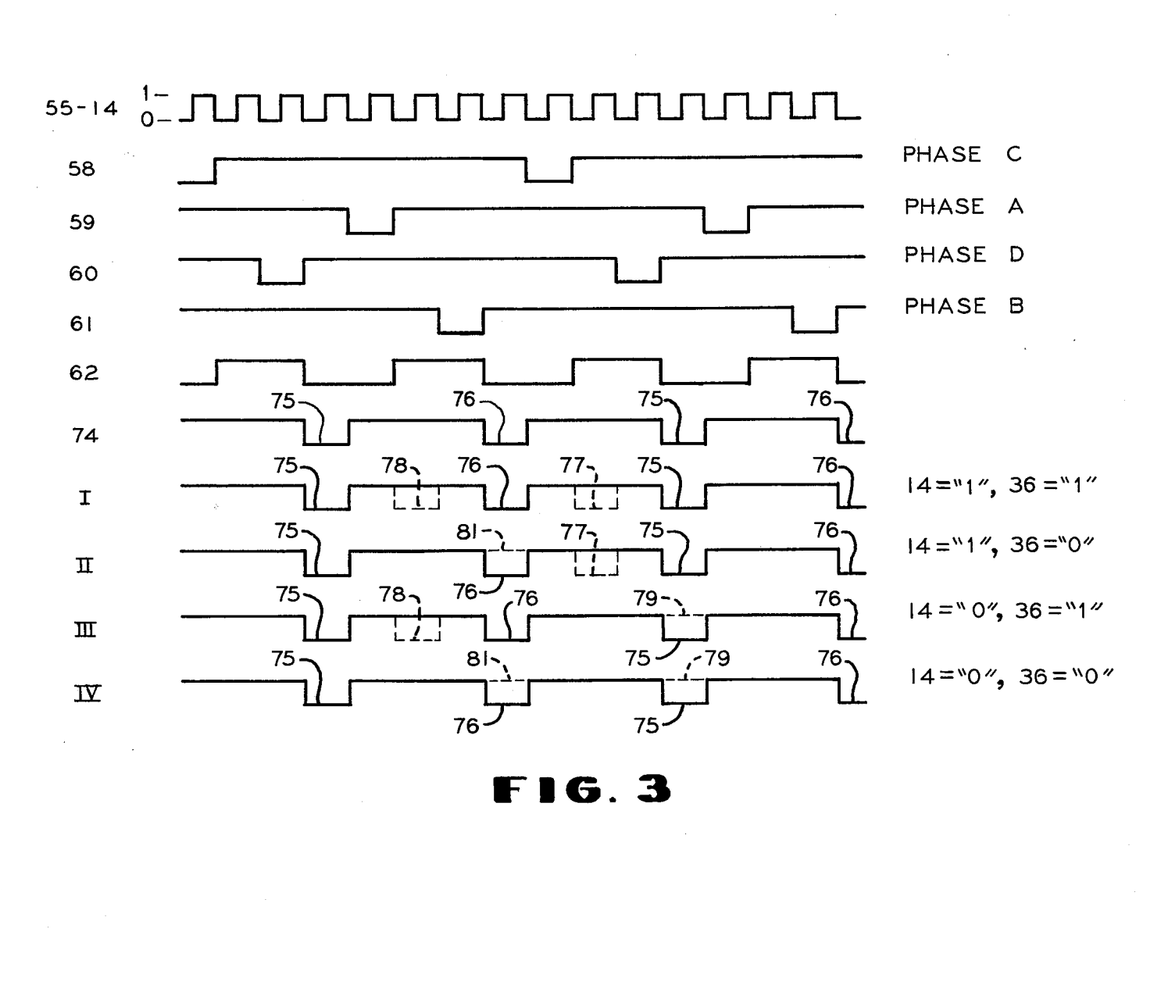
FIG. 3 is a wave form diagram of some of the signals generated by the pulse synchronizer circuit in the encoder interface circuit of FIG. 2.

The outputs 55-12, 55-9 and 55-8 are connected to inputs 57-12, 57-14 and 57-15 respectively of a four line to ten line decoder 57 which can be an SN74LS42 decoder manufactured by Texas Instruments, Inc. The decoder 57 has an A input 57-15, a B input 57-14, a C input 57-13 and a D input 57-12 which receive signals representing the one's, two's, four's and eight's bits of a binary coded decimal number. As can be seen in FIG. 2, the one's bit is the QC pulse train, the two's bit is the QB pulse train, the four's is always "0" since the input 55-13 is connected to the circuit ground potential, and the eight's bit is the QA pulse train. The decoder has zero through nine decimal outputs but only the zero 57-1, one 57-2, two 57-3 and three 57-4 outputs are utilized. The outputs 57-1 through 57-4 are connected to phase signal lines 58 through 61 respectively. The signal at each output is normally "1" and will change to "0" when addressed by the bits at the decoder inputs. There is shown in FIG. 3 a wave form diagram of the oscillator pulse train applied to the A clock input 55-14 and the phase A through D phase signals generated on the phase signal lines 59, 61, 58 and 60 respectively. There is also shown the pulse train generated at the QB output 55-9 as the frequency reference (FREQ. REF.) signal on a line 62. The frequency of the pulse train on the line 62 is one fourth and the frequency of the phase signals is one eighth of the predetermined frequency of the oscillator pulse train.

The X axis pulse synchronizer 52 includes a group of ten D flip flops, 63 through 72 and an AND gate 73 which are connected in a manner to generate a frequency error signal on a line 74 to the X axis phase comparator 53. The D flip flops shown in FIG. 2 generate a "1" at the inverting ($\overline{Q}$) output whenever the clear (CL) input is at "0" and generate a "0" at the inverting output whenever the preset (PR) input is at "0". If the clear and preset inputs are at "1", the inverting ($\overline{Q}$) and non-inverting (Q) outputs can only change logic states when a "0" to "1" transition occurs at the clock (CK) input. If the clear and preset inputs are at "1", and a "0" to "1" transition occurs at the clock (CK) input, the non-inverting output becomes equal to the same logic state which is present at the logic (D) input.

The X PLS signal on the line 13 is supplied to clock inputs 63-2 and 64-2 while the X DIR signal on the line 14 is supplied to logic inputs 63-1 and 64-1. The X ENC PLS signal on the line 35 is supplied to clock inputs 65-2 and 66-2 while the X ENC DIR signal on the line 36 is supplied to logic inputs 65-1 and 66-1. The clear inputs 63-4 and 65-4 and the preset inputs 64-3 and 66-3 are all disabled by connecting them to a +V power supply (not shown). The non-inverting output 63-5, 64-5, 65-5 and 66-5 are connected to logic inputs 67-1, 68-1, 69-1 and 70-1 respectively.

The clear inputs 67-4 and 69-4 and the preset inputs 68-3 and 70-3 are disabled by connecting them to the +V power supply (not shown). Non-inverting outputs 67-5 and 69-5 are connected to logic inputs 71-1 and 72-1. The outputs 67-5 and 69-5 are also connected to preset inputs 63-3 and 65-3 respectively.

The inverting outputs 71-6, 68-6, 72-6 and 70-6 are connected to inputs 73-1, 73-2, 73-3 and 73-4 respectively of an AND gate 73. The outputs 68-6 and 70-6 are also connected to clear inputs 64-4 and 66-4 respectively. An AND output 73-5 is connected to a line 74.

Preset inputs 71-3 and 72-3 are disabled by connecting them to the +V power supply (not shown).

The operation of the pulse synchronizer 52 is controlled by the four phase signals received from the phase signals generating means 51. The PHASE C signal on the line 58 is supplied to clock inputs 67-2 and 68-2, a preset input 69-3 and a clear input 72-4. The PHASE A signal on the line 59 is supplied to clock inputs 69-2 and 70-2, a preset input 67-3 and clear input 71-4. The PHASE D signal on the line 60 is supplied to a clock input 71-2 and a clear input 68-4. The PHASE B signal on the line 61 is supplied to a clock input 72-2 and a clear input 70-4.

There is shown in FIG. 3 a wave form diagram which will be utilized to discuss the operation of the pulse synchronizer 52. As previously mentioned, the binary counter 55 generates the frequency reference signal on the line 62 at a frequency equal to one-fourth the frequency of the oscillator signal at the input 55-14. The BCD-to-decimal decoder 57 generates each of the output phase signals at a frequency equal to one-eighth of the oscillator frequency.

The phase signals supplied to the pulse synchronizer 52 control the flip flops 63 through 72 such that, if neither an X PLS signal nor an X ENC PLS signal is present on the lines 13 and 35 respectively, the frequency error signal on the line 74 will be generated at a frequency equal to the frequency reference signal on the line 62. As X PLS pulses and X ENC PLS pulses appear on the respective lines, the frequency error signal on the line 74 is frequency modulated in accordance with the logic level of the X DIR and X ENC DIR signals. A logic "1" on the line 14 and a logic "0" on the line 36 indicates one direction of movement for the respective encoder shaft while a logic "0" on the line 14 and a logic "1" on the line 36 indicates the opposite direction of movement.

The AND 73 generates an output signal at logic "1" only when all of its inputs are at logic "1". When no pulses are present on the lines 13 and 35, the PHASE D signal clocks and the PHASE A signal clears the flip flop 71 such that it generates a "0" pulse at the output 71-6 to the AND input 73-1. This causes the AND 73 to generate the "0" pulses 75 in the frequency error signal on the line 74. The PHASE B signal clocks and the PHASE C signal clears the flip flop 72 such that it generates a "0" pulse at the output 72-6 to the AND input 73-3. This causes the AND 73 to generate the "0" pulses 76 in the frequency error signal.

As X PLS pulses and X ENC PLS pulses appear on the lines 13 and 35 respectively, the frequency of the frequency error signal on the line 74 will change in accordance with the logic value of the corresponding direction signals. If the X DIR signal on the line 14 is at logic "1", indicating one direction of rotation, and the signal on the line 13 goes from logic "0" to logic "1", the PHASE C signal will clock the flip flop 68 such that a "0" pulse is generated at the output 68-6 to cause the AND 73 to generate a "0" pulse 77 in the frequency error signal. The pulse 77 is shown in dashed form in FIG. 3. Similarly, if the X ENC DIR signal is at logic "1", representing the opposite direction of movement, and the signal on the line 35 goes from "0" to "1", the PHASE A signal will clock the flip flop 70 such that a "0" pulse is generated at the output 70-6 to cause the AND 73 to generate a "0" pulse 78 in the frequency error signal. The pulse 78 is shown in dashed form in FIG. 3. Thus, when the direction signals on the lines 14 and 36 are at logic "1", a "0" to "1" transition on either one of the lines 13 or 35 will cause a pulse to be added to the frequency error signal, thereby increasing the frequency of the signal on the line 74.

If the direction lines 14 and 36 are at logic "0", and a "0" to "1" transition occurs on the corresponding pulse line, a pulse will be subtracted from the frequency error signal such that the frequency of the signal is decreased. For example, if the X DIR signal on the line 14 is at "0", and a "0" to "1" transition occurs on the line 13, the PHASE D signal will clock the flip flop 71 such that output 71-6 remains at logic "1". Thus, the AND 73 will not generate one of the pulses 75, and the frequency error signal remains at logic "1" as indicated by the dashed line 79. Similarly, if the X ENC DIR signal on the line 36 is at logic "0", and a "0" to "1" transition occurs on the line 35, the PHASE B signal will clock the flip flop 72 such that the output 72-6 remains at logic "1". This causes the AND gate 73 not to generate one of the pulses 76 and the frequency error signal remains at logic "1" as indicated by the dashed line 81.

There are shown in FIG. 3 wave forms I through IV which represent the alternating pulse train on the line 74 modulated in accordance with the signals on the lines 14 and 36 of FIG. 2. In each wave form, the signal is clocked from the direction line by a pulse on the pulse line during the first 75 pulse on the line 74. As shown in the I wave form, a "1" on the direction line 14 generates a pulse 77 and a "1" on the direction line 36 generates a pulse 78, each pulse increasing the frequency of the pulse train with respect to the frequency reference signal on the line 62. As shown in the II wave form, a "1" on the direction line 14 generates a pulse 77 and a "0" on the direction line 36 eliminates a 76 pulse at 81. Thus, the pulse train frequency would be unchanged. As shown in the III wave form, a "0" on the direction line 14 eliminates a 75 pulse at 79 and a "1" on the direction line 36 generates a 78 pulse to maintain the frequency of the pulse train. As shown in the IV wave form, a "0" on the direction lines 14 and 36 eliminates a 75 pulse at 79 and a 76 pulse at 81 respectively to reduce the frequency of the pulse train.

The frequency reference signal on the line 62 and the frequency error signal on the line 74 are supplied to the X axis phase comparator 53 which functions to generate the X ERROR signal to the X axis motor driver 18. The signal on the line 62 is supplied to a ten bit binary counter 82 which generates an output signal on the line 83 having a frequency equal to the frequency reference signal frequency divided by one thousand twenty-four. The signal on the line 74 is an input to a ten bit binary counter 84 which generates a signal on the line 85 having a frequency equal to the frequency error signal frequency divided by one thousand twenty-four. Both the counter 82 and the counter 84 can be constructed from three cascaded SN74LS93 four bit binary counters manufactured by Texas Instruments.

As previously mentioned, the frequency error signal on the line 74 is frequency modulated with respect to the frequency reference signal on the line 62 by an amount representing the error between the actual and the desired position of the machine tool. Counters 82 and 84 function to reduce the frequencies of the signals on the lines 62 and 74 to generate a pair of phase related signals on the lines 83 and 85, respectively. The phase relationship between the signals on the lines 83 and 85 represent the error between the actual and the desired position of the machine tool. The phase related signals on the lines 83 and 85 are supplied to a pair of D flip flops 86 and 87 which function as a phase comparator to generate output signals at inverting inputs 86-6 and 87-6 on a pair of lines 88 and 89 respectively. The phase comparator 53 shown in FIG. 2 is similar to the phase comparator described in U.S. patent application Ser. No. 888,482 entitled "Resolver Interface For Servo Position Control" which is incorporated herein by reference.

The signal on the line 83 is supplied to a clock input 86-2, a logic input 87-1 and a clear input 87-4. The line 85 is connected to a logic input 86-1, a clear input 86-4 and a clock input 87-2. The preset inputs 86-3 and 87-3 are each connected to the +V power supply (not shown). The lines 88 and 89 are connected to the cathodes of a pair of light emitting diodes (LEDs) 91 and 92 having anodes connected to the +V power supply through a current limiting resistor 93. A pair of phototransistors 94 and 95 are responsive to the light emitted by the LEDs 91 and 92 respectively. The phototransistor 94 has a collector connected to a +E power supply (not shown) and an emitter connected to the line 17. The phototransistor 95 has a collector connected to the to the line 17 and an emitter connected to a −E power supply (not shown).

Figure 4:
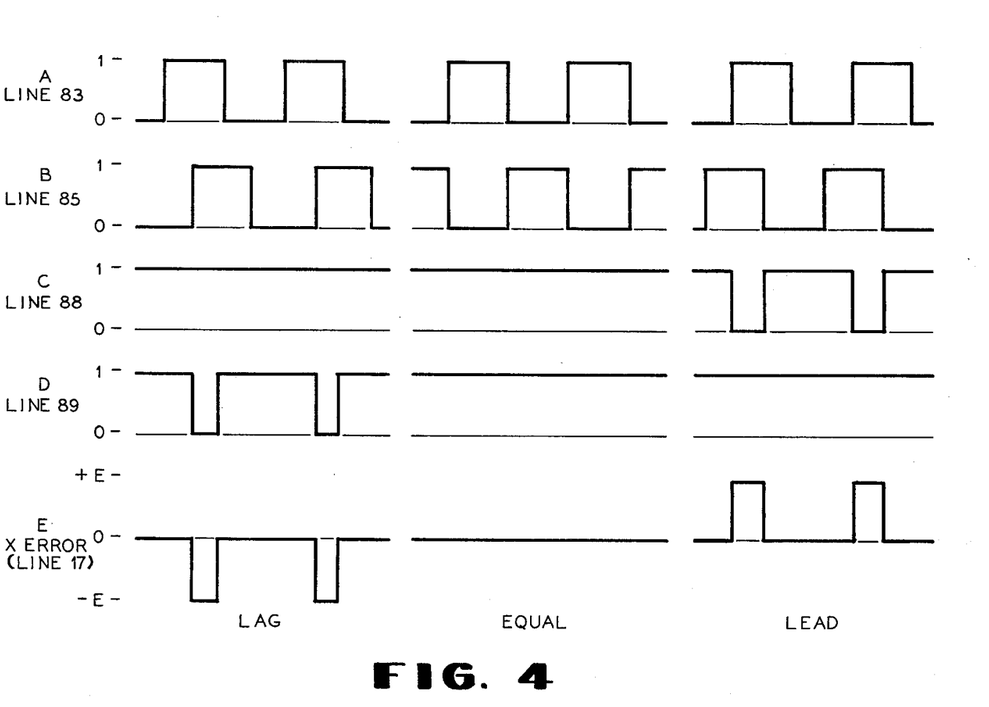
FIG. 4 is a wave form diagram of some of the signals generated by the phase comparator circuit in the encoder interface circuit of FIG. 2.

There are shown in FIG. 4 wave form diagrams which illustrate the operation of the phase comparator 53 of FIG. 2. As previously mentioned, the signals on the lines 83 and 85, shown as wave forms A and B respectively of FIG. 3, are generated with a phase relationship representing the desired position of the error between the actual and the machine tool. The wave forms A through E in the column designated "EQUAL" are those generated when the actual position of the encoder shaft equals the desired position. In this case, the frequencies of the signals on the lines 62 and 74 are equal and the flip flops 86 and 87 generate "1" signals on the lines 88 and 89, shown as wave forms C and D respectively, which control the phototransistors 94 and 95 such that the X ERROR signal on the line 17, shown as waveform E, will be at ground potential. Hence, no correction will be made in the position of the machine tool.

When the frequency of the signal on the line 74 is less than the reference frequency on the line 62, the phase of the signal on the line 85 lags that of the signal on the line 83, and the phase comparator 53 generates the wave forms A through E shown in the "LAG" column of FIG. 4. The signals on the lines 88 and 89 are generated such that the X ERROR signal on the line 17 is formed of negative voltage pulses having a duration which is proportional to the phase difference between the signals on the lines 83 and 85. These negative voltage pulses are applied to the respective axis motor driver which in turn advances the position of the motor shaft to reduce the phase lag.

When the frequency of the signal on the line 74 is greater than the reference frequency on the line 62, and the phase of the signal on the line 85 leads that of the signal on the line 83, and the phase comparator 53 generates the wave forms A through E shown in the "LEAD" column. In this case, the X ERROR signal on the line 17 is formed of positive voltage pulses which are utilized to retract the position of the motor shaft to reduce the phase lead.

The duration of the error signal pulses generated by the phase comparator 53 is proportional to the amount of error between the actual and desired position of the machine tool. The signal can be integrated to provide a DC level depending upon the type of motor driver.

In summary, the present invention concerns an interface circuit in an apparatus for controlling the movement of an object along a predetermined path. The apparatus includes a motor for moving the object along the path, drive means for controlling the motor in response to a position error signal representing the difference between a selected position along the path and the actual position of the object along the path, a control circuit for generating a control signal representing the selected position, a position encoder coupled to the motor for generating a feedback signal representing the actual position of the object along the path, and the interface circuit responsive to the control signal and to the feedback signal for generating the position error signal. The interface circuit includes means for generating a cyclic reference signal at a predetermined frequency, means for generating a cyclic error signal at the predetermined frequency, means for frequency modulating the error signal with the control signal and the feedback signal, and means responsive to the reference signal and the modulated error signal for generating the position error signal.

In accordance with the provisions of the patent statutes, the principle and mode of operation of the invention have been explained and illustrated in its preferred embodiment. However, it must be understood that the invention can be practiced otherwise than as specifically illustrated and described without departing from its spirit or scope.

What is claimed is:

1. In an apparatus for controlling the movement of an object along a predetermined path including a motor for moving the object along the path, drive means for controlling the motor in response to a position error signal representing the difference between a selected position along the path and the actual position of the object along the path, a control circuit for generating a control signal representing the selected position, a position encoder coupled to the motor for generating a feedback signal representing the actual position of the object along the path, and an interface circuit responsive to the control signal and to the feedback signal for generating the position error signal, the interface circuit comprising:

means for generating a cyclic reference signal at a predetermined frequency;
means for generating a cyclic error signal at said predetermined frequency;
means for modulating said error signal with the control signal and the feedback signal; and
means responsive to said reference signal and said modulated error signal for generating the position error signal.

2. An interface circuit according to claim 1 wherein the control signal and the feedback signal each have a direction component and distance component, the distance components being pulse trains with each pulse representing a predetermined increment of distance along the path, and said modulating means is responsive to said direction components for adding the respective distance component pulses to or subtracting the distance component pulses from said error signal.

3. An interface circuit according to claim 2 wherein said direction component of the control signal has a first state for indicating movement in one direction along the path and a second state for indicating movement in the opposite direction along the path and wherein said modulating means includes means responsive to said control signal distance component and said control signal direction component for adding a pulse signal to said error signal for each pulse of said control signal distance component when said control signal direction component is in said first state and for subtracting a pulse signal from said error signal for each pulse of said control signal distance component when said control signal direction component is in said second state.

4. An interface circuit according to claim 2 wherein said direction component of the feedback signal has a first state for indicating movement in one direction along the path and a second state for indicating movement in the opposite direction along the path and wherein said modulating means includes means responsive to said control signal distance and direction components for adding a pulse signal to said error signal for each pulse of said control signal distance component when said control signal direction component is in said first state and for subtracting a pulse signal from said error signal for each pulse of said control signal distance component when said control signal direction component is in said second state.

5. An interface circuit according to claim 1 wherein said means for modulating said error signal includes means for frequency modulating said error signal with the control signal and the feedback signal and means for converting the frequency modulation to phase modulation with respect to said reference signal to generate said modulated error signal.

6. In a servo system including an interface circuit responsive to a control signal and a feedback signal for generating an error signal, means responsive to the error signal for controlling a servo motor, means for generating the control signal representing a desired movement of the servo motor, and means for generating the feedback signal representing the actual movement of the servo motor, the interface circuit comprising:
   means for generating a pulsed reference signal at a predetermined frequency;
   means for generating a pulsed error signal at said predetermined frequency;
   means responsive to the control signal and the feedback signal for modulating said error signal by adding pulses to or subtracting pulses from said error signal; and
   means responsive to said reference signal and said modulated error signal for generating the position error signal representing the phase difference between said reference signal and said modulated error signal.

7. An interface circuit according to claim 6 wherein the control signal and the feedback signal each have a direction component and a distance component, the distance components being pulse trains with each pulse representing a predetermined increment of movement of the motor, and wherein said modulating means is responsive to said direction components for adding the respective distance component pulses to or subtracting the respective distance component pulses from said error signal.

8. An interface circuit according to claim 7 wherein each of said direction components has a first state representing movement of the motor in one direction and a second state representing movement of the motor in the opposite direction and wherein said modulating means is responsive to each of said direction components in said first state for adding the respective distance component pulses to said error signal and is responsive to each of said direction components in said second state for subtracting the respective distance component pulses from said error signal for generating said modulated error signal.

9. An interface circuit according to claim 6 wherein said reference signal generating means includes an oscillator for generating a pulse train at a first predetermined frequency, counter means responsive to said first predetermined frequency pulse train for generating said reference signal and at least one pulse train at a second predetermined frequency, and decoder means responsive to said reference signal and said second predetermined frequency pulse train for generating at least a first and a second phase signal pulse trains at a third predetermined frequency and out-of-phase with each other; and wherein said error signal generating means is responsive to said first and second phase signals for generating said error signal.

10. An interface circuit according to claim 9 wherein said decoder means generates a third and a fourth phase signal pulse trains at said third predetermined frequency and out-of-phase with each other and said first and second phase signals; and wherein said modulating means is responsive to the feedback signal and said first phase signal for subtracting pulses from said error signal, is responsive to the feedback signal and said third phase signal for adding pulses to said error signal, is responsive to the control signal and said second phase signal for subtracting pulses from said error signal, and is responsive to the control signal and said fourth phase signal for adding pulses to said error signal.

11. An interface circuit according to claim 6 wherein said means for modulating said error signal includes means for phase shifting said modulated error signal with respect to said reference signal.

12. In a system for controlling the movement of an object along a path defined by at least two axes including an individual motor for moving the object along each axis, individual drive means for controlling each motor in response to a position error signal representing the difference between a selected position along the axis and the actual position of the object along the axis, a control circuit for generating a control signal for each axis representing the selected position, an individual position encoder coupled to each motor for generating a feedback signal representing the actual position of the object along the corresponding axis, and an interface circuit responsive to the control signals and to the feedback signals for generating the position error signals, the interface circuit comprising:
   means for generating a cyclic reference signal at a predetermined frequency;
   means individual to each axis for generating a cyclic error signal at said predetermined frequency;
   means individual to each axis for modulating the corresponding error signal with the corresponding control and feedback signals; and
   means individual to each axis responsive to said reference signal and said corresponding modulated error signal for generating the corresponding position error signal.

13. A method of generating a position error signal in a servo system which generates a control signal representing the desired position of a servo motor shaft and a feedback signal representing the actual position of the servo motor shaft, the method comprising the steps of:

generating a cyclic reference signal at a predetermined frequency;

generating a cyclic error signal at said predetermined frequency;

frequency modulating said error signal with the control signal and the feedback signal;

converting said frequency modulated error signal to a phase modulated error signal; and generating the position error signal representing the phase difference between said reference signal and said phase modulated error signal.

14. The method according to claim 13 wherein said reference signal and said error signal are pulse trains and said error signal is frequency modulated by adding pulses to or subtracting pulses from said error signal pulse train.

15. In an apparatus for controlling the movement of an object along a predetermined path including a motor for moving the object along the path, drive means for controlling the motor in response to a position error signal representing the difference between a selected position along the path and the actual position of the object along the path, a control circuit for generating a control signal representing the selected position, a position encoder coupled to the motor for generating a feedback signal representing the actual position of the object along the path, and an interface circuit responsive to the control signal and to the feedback signal for generating the position error signal, the interface circuit comprising:

means for generating a cyclic reference signal at a predetermined frequency;

means for generating a cyclic error signal at said predetermined frequency;

means for frequency modulating said error signal with the control signal and the feedback signal; and means responsive to said reference signal and said frequency modulated error signal for generating the position error signal including means for converting said frequency modulated error signal to a phase modulated error signal with respect to said reference signal and means responsive to said reference signal and said phase modulated error signal for generating the position error signal.

* * * * *

UNITED STATES PATENT AND TRADEMARK OFFICE
CERTIFICATE OF CORRECTION

PATENT NO. : 4,264,850

DATED : April 28, 1981

INVENTOR(S) : Cannon et al.

It is certified that error appears in the above—identified patent and that said Letters Patent are hereby corrected as shown below:

Column 7, lines 31-32    change "desired position of the error between the actual and" to -- error between the actual and the desired position of --.

Signed and Sealed this

Twenty-eighth Day of July 1981

[SEAL]

Attest:

Attesting Officer

GERALD J. MOSSINGHOFF

Commissioner of Patents and Trademarks